United States Patent [19]

Drapeau

[11] Patent Number: 4,483,512
[45] Date of Patent: Nov. 20, 1984

[54] SLOW OPENING VALVE

[75] Inventor: Donald F. Drapeau, South Hadley Falls, Mass.

[73] Assignee: The United States of America as represented by the Administrator of the National Aeronautics and Space Administration, Washington, D.C.

[21] Appl. No.: 392,104

[22] Filed: Jun. 25, 1982

[51] Int. Cl.³ .............................................. F16K 31/44
[52] U.S. Cl. .................................. 251/265; 251/267; 251/284; 251/297; 74/424.8 B; 74/424.8 VA
[58] Field of Search ............... 74/424.8 B, 424.8 VA; 251/284, 297, 265, 266, 267

[56] References Cited

U.S. PATENT DOCUMENTS

| | | | |
|---|---|---|---|
| 1,696,070 | 12/1928 | Wood | 251/265 |
| 2,784,934 | 3/1957 | Pauluis et al. | 251/265 |
| 2,906,288 | 9/1959 | Young | 251/297 |
| 3,174,355 | 3/1965 | De Craene | 74/424.8 VA |
| 3,550,903 | 12/1970 | Hauser | 251/265 |
| 3,820,565 | 6/1974 | Durbin | 251/265 |
| 4,293,118 | 10/1981 | Olson et al. | 251/297 |

Primary Examiner—A. Michael Chambers
Attorney, Agent, or Firm—Russell E. Schlorff; John R. Manning; Marvin F. Matthews

[57] ABSTRACT

A valve control having a valve body (5) with an actuator stem (16) and a rotating handle (35) connected to the actuator stem by differential drive mechanism (25, 26) which, during uniform movement of the handle in one direction, initially opens the valve (20) at a relatively slow rate and, thereafter, completes the valve movement at a substantially faster rate. A series of stop rings (44–48) are received about the body in frictional abutting relationship and serially rotated by the handle to uniformly resist handle movement independently of the extent of handle movement.

5 Claims, 3 Drawing Figures

SLOW OPENING VALVE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; USC 2457).

DESCRIPTION

1. Technical Field

This invention relates to valves for varying the rate of supply of a fluid during uniform manipulation of the valve actuator. More particularly, the invention relates to actuator means for bringing a charge in a fixed volume tank to an optimum pressure during initial movement of the actuator and, thereafter, the actuator movement increasing flow at a rapid rate.

2. Background of the Invention

The design of the portable oxygen system (POS) for the space shuttle required a device which, upon command from the astronaut, initiated the flow of oxygen to said astronaut. It was required that initially the flow of oxygen be increased slowly in order to prevent local overheating to the system caused by adiabatic expansion of the oxygen in a high pressure system. Conversely, when pressurized, it was necessary to increase the valve opening rate in order to limit the rotations of the POS to a number consistent with sound operational practices in a space environment.

In addition, friction was found necessary to control the rate of rotation of the POS by the astronaut and a means had to be found to provide a multi-rotational device while at the same time minimizing the forces transmitted from the handle to the stops.

Linearly moving control valves having rotary actuators have been provided with differential threads for varying the relationship of the actuator and the rate of supply of the controlled fluid. See, for instance, the following United States patents: Hauser U.S. Pat. No. 3,550,903; Rawlings U.S. Pat. No. 2,966,170; Clarke U.S. Pat. No. 3,326,512; Kallenbach Kaucher U.S. Pat. No. 3,615,072. However, none of these patent disclosures is fully adequate to solve the particular problem described above.

DISCLOSURE OF THE PRESENT INVENTION

In accordance with the present invention, a shut-off valve for a portable oxygen supply container has an actuator handle connected to a nut member having differential external and internal threads meshing, respectively, with internal threads on a stationary body and external threads on an anti-rotated screw. The valve stem and differential screw move linearly to open a supply valve and the differential threading is designed so that with uniform opening movement of the actuator, the valve initially opens slowly, and, thereafter, the valve opens more rapidly until the actuator reaches its full open position. Assisting in assuring the initial slow opening movement of the valve and in order to prevent over-torquing of the differential drive mechanism, radial stop mechanism is provided which initially applies adjustable, substantially uniform resistance to actuator rotation and, ultimately, stops the actuator movement. Accordingly, the present shut-off valve minimizes the rate of flow when opening is initiated, increases the rate of flow when the system is adequately pressurized, provides adjustable operating torque, provides a radial stop, preventing over-torquing of the valve helix drive mechanism, and provides a stop mechanism which adequately sustains the valve driving torque independent of the number of turns or the pitch of the helix.

DETAIL DESCRIPTION OF THE DRAWINGS

Figure 1:
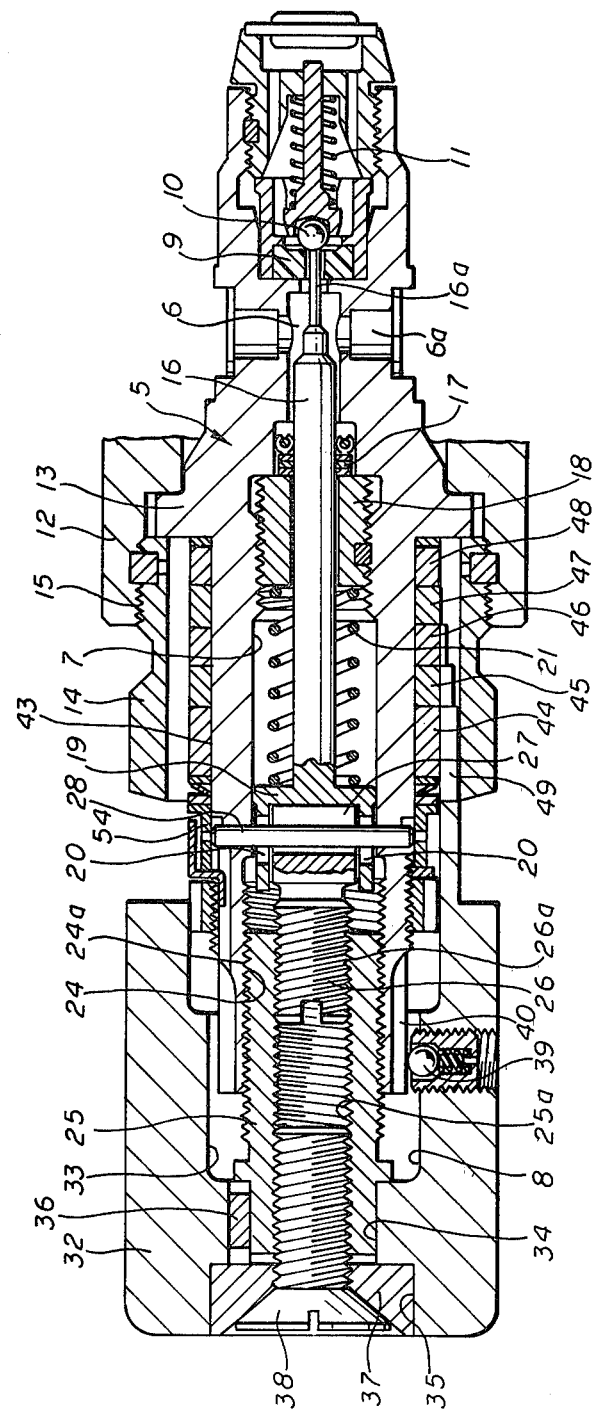
FIG. 1 is a longitudinal center section through the valve and control mechanism.

The novel valve comprises a valve body 5 having aligned, interconnected longitudinal passageways 6, 7, and 8 and a valve seat element 9 at the forward end of passageway 6. A ball valve 10 is urged against seat 9 by a coiled spring 11 which normally holds the valve closed. In an exemplary embodiment, the ball is of sapphire and the seat is Vespel-21 to insure a tight seal. A portion 12 of the discharge manifold of an oxygen supply container receives an annular rib 13 on body 5 for securement thereto. The assembly is maintained by a retainer nut 14 threadedly attached to manifold 12 at 15.

A valve stem 16 extends centrally through chamber 7 and into chamber 6 and has a reduced stem portion 16a extending through the remainder of passageway 6 and through valve seat 9 for unseating the valve ball 10, as will be explained. Passageway 6 serves to admit oxygen from the portable supply through one or more ports (6a) and is sealed by shaft packing 17 held in place by packing nut 18.

At the rear end of stem 16 there is a cup-shaped plunger 19 with side walls slidably engaging the wall of intermediate passageway 7 and having laterally aligned slots 20. A coiled spring 21 compressed between nut 18 and plunger 19 urges stem 16 rearwardly, i.e. in the direction to withdraw stem extension 16a from contact with valve ball 10.

The rear end of body 5 has internal threads 24 meshing with external threads 24a on a differential nut 25 in the form of a sleeve. Sleeve 25 has internal threads 25a meshing with threads 26a on a differential screw 26 which extends into plunger cup 19 and has a slot 27. An anti-rotation pin 28 extends through aligned slots 27 and 20 and is terminally seated in the rear end portion of body 5 so as to prevent relative rotation of screw 26 and nut 25 while permitting relative longitudinal movements of the screw and nut within limits.

A generally cylindrical handle 32 has a hollow interior 33 with reduced rear end parts 34 and 35 receiving an anti-rotation key 36, conical washer 37, and the head of a flat-head screw 38 securing the handle 32 to differential nut 25. A spring loaded detent ball 39 in the handle may register with a recess 40 in the end portion of the body to establish and limit the extreme open-closed positions of the handle and, through it, of the differential nut 25, screw 26, and valve stem 16.

Figure 3:
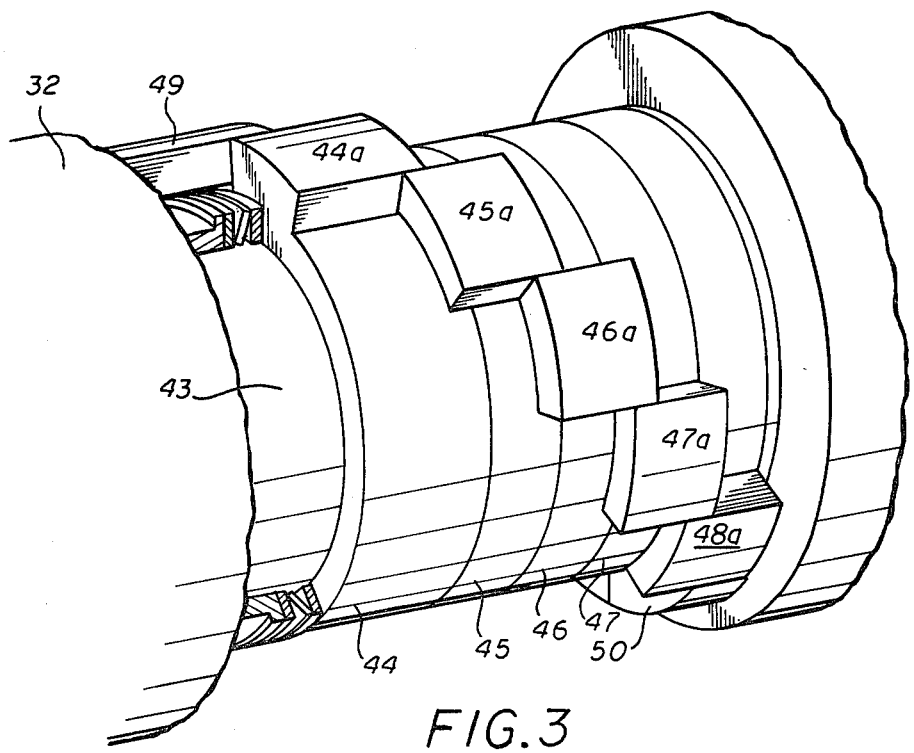
FIG. 3 is an enlarged, external view of the stop mechanism.

Snugly but rotatably received about the tubular intermediate portion 43 of the body are a plurality of frictional stop rings 44–48 having radial stop lugs 44a–48a, best shown in FIG. 3. A drive lug 49 extends partially across stop ring 44 to engage stop lug 44a when the handle is turned clockwise to rotate ring 44. As will be explained, the lugs are engaged in succession by preceding lugs until last lug 48a strikes fixed body stop lug 50.

Figure 2:
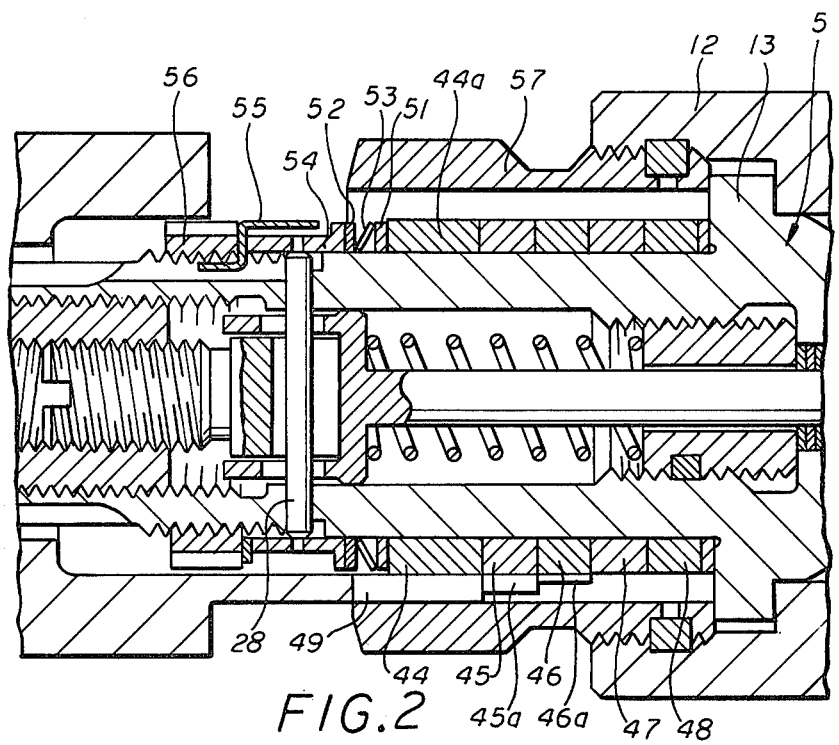
FIG. 2 is an enlargement of a portion of FIG. 1.

As shown in FIGS. 2 and 3, first friction ring 44 is abutted on its rear edge by a pair of washers 51 and 52 and a Belleville spring washer 53 forming a preload spring assembly for the stop rings 44-48. The extreme end of anti-rotation pin 28 are seated in the spacer 54 lodged between and bearing against the rearmost spring washer 52 and the intermediate portion of a double-angle lock washer 55 which, in turn, bears against and underlies the preload adjustment and stop nut 56. Retainer nut 14 extends forwardly from body rib 13 along and spaced outwardly from friction stop rings 44-48 and their actuating tabs 44a-48a and long handle lug 49.

OPERATION

As handle 32 and differential nut 25 are rotated in the valve opening direction from the closed and latched position, non-rotating differential screw 26 is slowly driven forwardly, first to take up the clearance in slots 20 and contact ball 10 and, thereafter, to slowly unseat the ball. After differential nut 25 bottoms on plunger cup 19, stem 16, 16a advances at a much faster rate to fully open the ball valve during one turn of the handle. In the exemplary embodiment mentioned, as the handle rotates 4½ turns in the valve opening direction, the stem moves linearly at the rate of 0.0016 inch per turn to open the valve and charge an oxygen container at the optimum safe rate and adequate pressure. When differential nut 25 bottoms on plunger cup 19, the nut, through its differential threads 25a, drives screw 26 and stem 16, 16a forwardly at a faster rate of 0.0029 per inch turn to the full open position of the handle. In other words, with a 5½ turn valve, the first turn-and-a-half is pretravel with the stem moving toward contact with the ball; from turn one-and-a-half to four-and-a-half turns there is slow movement of the ball from the seat (0.0016 inch/turn); from turn four-and-a-half to turn five-and-a-half there is fast valve opening (0.0029 inch/turn)/ with a detented and positive on/off stop and a usual on/off indicator.

The radial stop rings 44-48 are provided to assist, by frictional resistance therebetween, the differential screw and nut arrangement to insure the desired initial slow and final rapid opening movement of the valve stem. The stop rings function as follows: The desired initial frictional resistance between the abutting edges of the stop rings and thereby the initial resistance to handle rotation, is first established by rotation of adjusting nut 56 to compress the Belleville washer assembly 51, 52, 53. When the handle is turned, long drive lug 49a thereon engages lug 44a and rotates first ring 44 generating frictional resistance between rings 44 and 45. Continued turning of the handle brings lug 45a into engagement with lug 46a and rotation of second ring 46 to generate frictional resistance between rings 46 and 47. Lug 47a engages lug 48a, rotating it and ring 48 and generating frictional resistance between ring 48 and valve body until lug 48a engages fixed stop 50 on the body to positively stop the valve opening rotation of the handle. The value of the resistance between each moving ring and its abutting stationary ring or body is sufficient to slow the rotation of the handle, but not sufficient to make the handle hard to turn. An additional function of the stop rings 44-48 is to minimize the force that can be transmitted from the handle 32 to the fixed stop either 49 and 50, while, at the same time, permitting multi-rotation of the handle 32.

To close the valve, handle 32 is rotated in the opposite direction, which rotates differential drive nut 25 which, in turn, rotates drive screw 26 toward the closed position. Plunger 19 of the spring-loaded valve stem 16 eventually re-engages differential screw 26 and is spring driven away from ball 10 which is driven against the Vespel seat 9 by preload spring 11, cutting off the flow of oxygen to the charged container. The stop mechanism operates in the same manner as in the opening direction until engagement of body stop 49.

The described valve has the desired variable action during same direction movement of the handle. The slow initial opening of the valve is provided by a pair of cooperating mechanisms, i.e. the differentially threaded screw and nut and the successively acting frictional stop rings. The stop ring mechanism applies substantially uniform resistance throughout handle movement, rather than increasing resistance as conventional springs are pressured. The stop rings also positively limit opening movement of valve stem 16,16a so as to prevent overstressing of the springs 21 and 11. It will be understood that the differential threading is a special form of helical drive.

The invention may be modified as will occur to those skilled in the art and exclusive use of all modifications as come within the scope of the appended claims is contemplated.

I claim:

1. A valve comprising a hollow, cylindrical body, a valve seat and a valve member at one end of said body, a valve actuator for said valve member extending through said body, a handle rotatable on said body, differential drive means between said handle and said valve actuator adapted to cause, during opening movement of said valve, relatively slow initial opening of said valve and, thereafter, substantially faster movement thereof, a plurality of stop rings received about said body in side-by-side relationship, means to urge said rings together for producing frictional resistance between abutting edges thereof, lugs on said handles and said rings for serial engagement of said rings by said handle to uniformly resist handle rotation independently of the extent of hand rotation, and a fixed stop on said body to limit rotation of said rings and handle to prevent overstressing of said differential drive means.

2. The valve set forth in claim 1 characterized in that the differential drive means is formed of differential helices.

3. The valve set forth in claim 2 characterized in that the valve actuator on the end opposite the valve member terminates in a cup shaped member having a slot, a pin in said slot cooperating with said body to make said valve actuator non-rotative, a threaded member cooperating with said cup shaped member and said differential drive means, whereby rotation of the handle initially drives through the differential drive means the threaded member resulting in initially relatively slow movement of the valve actuator and subsequent faster movement of two valve opening and equalization is accomplished.

4. The valve set forth in claim 3 in which the stop rings are concentric and arranged in side-by-side series and each ring has a radially positioned lug overlapping the lug in the succeeding one in the series for engaging and moving the letter relative thereto, the lug on the final ring in the series engaging the fixed stop on the body to limit the rotation of the handle.

5. The valve set forth in claim 4 characterized in that the friction producing means is a Belleville spring.

* * * * *